Feb. 3, 1931.  L. F. HARZA  1,791,271
CONDUIT
Filed April 14, 1924  5 Sheets-Sheet 1

Feb. 3, 1931. L. F. HARZA 1,791,271
CONDUIT
Filed April 14, 1924 5 Sheets-Sheet 4

Feb. 3, 1931.  L. F. HARZA  1,791,271
CONDUIT
Filed April 14, 1924  5 Sheets-Sheet 5

Patented Feb. 3, 1931

1,791,271

UNITED STATES PATENT OFFICE

LEROY F. HARZA, OF CHICAGO, ILLINOIS

CONDUIT

Application filed April 14, 1924. Serial No. 706,234.

This invention pertains generally to conduits employed for conducting water or the like and more particularly to elbow conduits employed for changing the direction of flow, and while the principles of my invention may be embodied in conduits for various purposes, the invention as illustrated herein is embodied in a draft tube of a hydraulic turbine.

In hydraulic turbine installations the water must by necessity of construction be deflected from the direction in which it is discharged from the turbine and in order that the high velocity of the water at the discharge of the turbine may be gradually reduced to a low velocity with consequent conversion of the velocity head discharged from the turbine into a pressure head at the discharge end of said conduit, the conduit or draft tube, in accordance with my invention, is made of gradually increasing cross sectional area so that it will create an increased suction head on the discharge side of the turbine which tends to increase the effective head under which the turbine operates and thus increases the efficiency of the turbine.

If an elbow be employed in a draft tube or other conduit of uniform circular or other cross section, the water flowing therethrough becomes greatly agitated and disturbed by its change of direction, and consequently loses a large amount of energy. In making the turn at the elbow the water tends to crowd against the outer circumference of the elbow by which it is gradually deflected, but the water fails to follow the inner circumference of the elbow, and instead, forms eddies, swirls and cross currents which tend to cut down the flow and to diminish the recoverable energy.

One of the primary purposes of my present invention is to provide a conduit which will deflect or change the direction of flow of a stream of water without the production of eddies and cross currents and without loss of energy.

With this end in view, a conduit constructed in accordance with my invention includes an elbow, the outer circumference of which is gradually curved so as to deflect the outer side of the stream, and the inner circumference, instead of being formed on an arc parallel with the arc of the outer circumference, is shaped to conform to the contour of the inner side of a free jet of water impinging tangentially against the outer curved wall of the elbow. The water therefore follows the inner wall of the elbow smoothly and without the formation of objectionable cross currents and eddies.

A free jet of water impinging tangentially against a curved deflective surface either transversely flat or concave tends to expand laterally and to flatten out into a relatively thin, broad sheet of fan-like form. A theoretically perfect conduit would be constructed to conform exactly to the shape of such a deflected and flattened stream; constructional limitations, however, practically preclude the building of a conduit of the width to which the stream of water would naturally expand during its travel to the point of ultimate discharge into the tail water of the power plant.

Another object of my present invention therefore is to provide a conduit which will accommodate this lateral expansion of the stream but without exceeding the width within which it is advisable to construct a conduit. This desirable result is accomplished in my invention by constructing the conduit so that it will gradually fold the lateral margins of the stream inwardly toward the center, thereby bringing the overall lateral dimension of the conduit within reasonable limitations and without obstructing or disturbing the natural flow of the stream.

Other objects and many of the inherent advantages of my invention should be readily appreciated as the same becomes better understood by reference to the following description when considered in connection with the accompanying drawings.

Referring to the drawings:

Fig 14 is a similar view showing a modified form of conduit;

Figure 2:
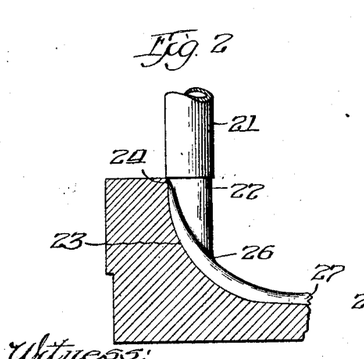
Fig. 2 is a side elevation showing the natural flow of a free jet of liquid impinging tangentially against a curved deflecting wall.
Figure 3:
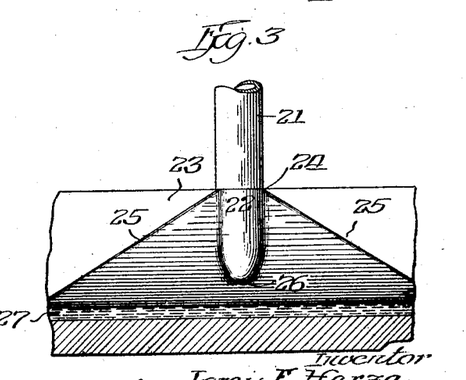
Fig. 3 is a front elevation of what is shown in Fig. 2.

Referring now to the drawings more in detail and first to Figs. 2 and 3, reference character 21 indicates a tube from which a jet of water, indicated generally by 22, issues tangentially to a curved deflecting surface 23. As will be apparent from the drawings, the outer edge or surface of the jet begins to diverge laterally from the point 24 where it first engages the deflecting surface, and the natural divergence of such a stream is shown in Fig. 3 where reference character 25 indicates the diverging lateral edges of the stream. The front edge of the stream, that is, the one most remote from the deflecting surface 23, continues downwardly in a straight line until it encounters the deflected filaments of water substantially at the point 26 whereupon the filaments of water of this portion of the stream are also deflected and the stream, when its direction has been completely changed, is of a broad, flat thin sheet of fan-like character of approximately the thickness indicated by reference character 27. Figs. 2 and 3 therefore illustrate the shape that a circular stream of water impinging tangentially against a curved deflecting surface will assume, and since this change of form of the stream is accomplished without the establishment of eddies, swirls, or cross currents, it follows that a conduit shaped in conformity with such a stream will conduct the water in the most efficient manner.

Figure 1:
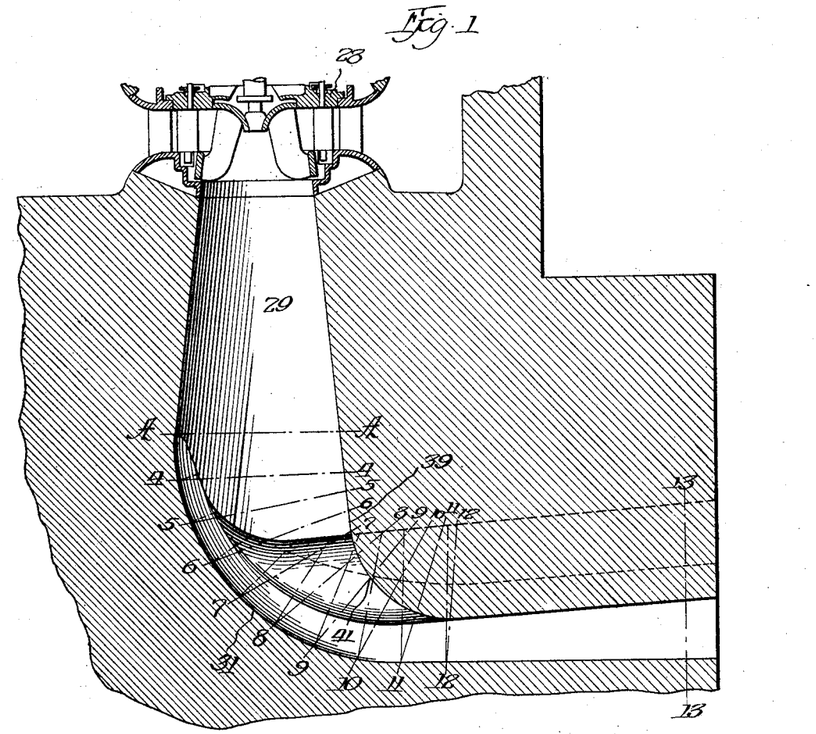
Fig. 1 is a diametric vertical sectional view through a conduit constructed in accordance with my invention.

Referring now to Fig. 1, there is illustrated in said figure a conduit embodying my invention and constructed to conduct a stream of water in substantially its normal condition as explained in connection with Figs. 2 and 3. The conduit of Fig. 1 is shown as the draft tube from a turbine 28, and the conduit is here shown to comprise first a vertical conical portion 29 gradually increasing in cross sectional area for the purpose of converting the velocity head of the water into a pressure head as is well understood. Said conical portion leading from the turbine to section AA (Fig. 1) is not a part of my invention as it is old in the art and not essential to the purpose of my invention, which concerns only the elbow and subsequent portion of the tube. The conical form of tube, as from the turbine to section AA, is generally believed to be the most efficient form of draft tube and as such it is intended to use it for such initial portion of the tube as the economically available head room or vertical space limitations will permit, thereafter applying my invention for efficiently deflecting the water at right angles thereto. If required to do so by economy or available vertical space, the turbine would be mounted at section AA, Fig. 1, the elbow comprising my invention thus beginning immediately at the turbine discharge.

The elbow by which the direction of the stream of water is changed comprises a curved outer deflecting wall 31 which extends from the outer end of the line A—A to the outer end of the line 12—12. This surface as shown is cylindrical or curved in only one direction as will be apparent from Figs. 4 to 12, inclusive, although the effect will be substantially the same if this curved surface is also curved transversely as indicated by reference character 32 in Fig. 16, this figure being a section substantially like the section shown in Fig. 4 except that the deflecting wall is transversely curved instead of being flat in section. The cross sectional shape of the conduit on the line A—A of Fig. 1 is circular as indicated by the dotted lines in Fig. 4, but as soon as the curvature of the deflecting surface 31 begins, the side walls of the conduit are laterally extended adjacent to the deflecting surface 31, providing pockets 33 to accommodate the beginning of the lateral expansion of the stream into a thin sheet which is the final form.

Figure 6:
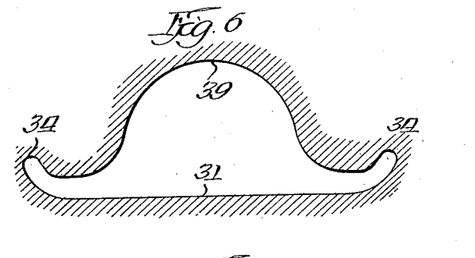
Fig. 6 is a similar view on the line 6—6 of Fig. 1.
Figure 7:
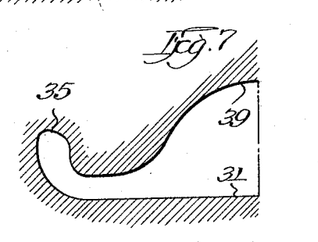
Figs. 7 to 12, inclusive, are one-half sectional views taken on the lines 7, 8, 9, 10, 11 and 12, respectively, of Fig. 1 showing the progressive changes in the cross sectional contour of the conduit.
Figure 8:
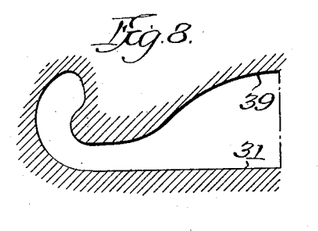
Figure 9:
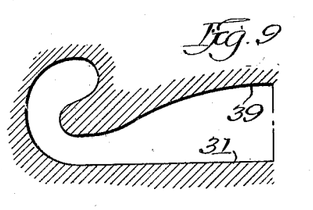
Figure 10:
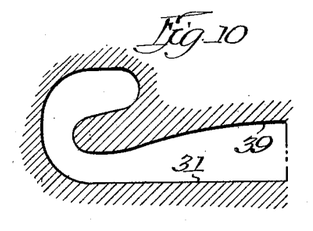
Figure 11:
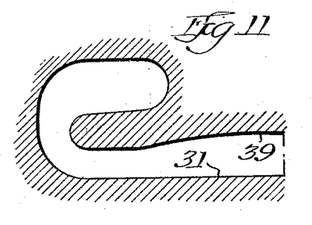

As the surface 31 progresses these pockets are gradually widened out into the ultimate thin sheet and the originally circular portion of the cross section bounded by surface 39, Fig. 6, is correspondingly reduced until it disappears altogether as shown in Figs. 2 and 3.

Figure 12:
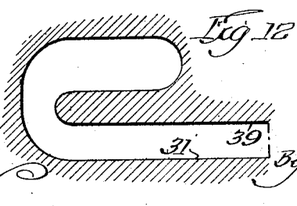
Figure 13:
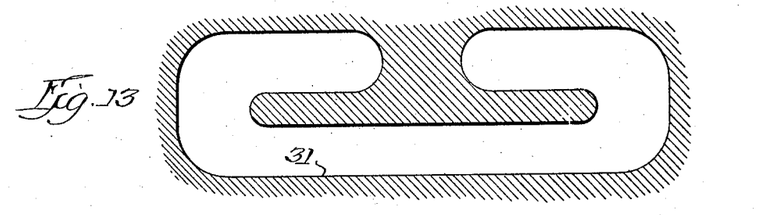
Fig. 13 is a full sectional view on the line 13—13 of Fig. 1.

If the conduit were to conform exactly to the shape of the stream illustrated in Figs. 2 and 3, the pockets 33 would continue to increase in lateral depth until the conduit would become impractically wide. I have found, however, that the conduit may be confined within reasonable width limitations without obstructing or disturbing the flow of the stream to the extent of producing objectionable eddies or cross currents, by gradually folding the margins of the stream back toward the center. These margins may be folded either upwardly or downwardly, but in the construction shown in Figs. 4 to 13, inclusive, for illustrative purposes, the pockets of the conduit are turned upwardly and inwardly. Viewing Figs 4 to 12 progressively it will be apparent that the pockets 33 are extended laterally slightly in Fig 4, then farther in Fig. 5, and when the cross section 6—6 of Fig. 1 has been reached, the ends of the pockets are beginning to turn upwardly as indicated at 34 in Fig. 6. This upward bending is continued at Fig. 7, from which it will also be observed that the ends 35 of the pockets begin to widen out to accomodate a greater volume of water. In Figs. 8, 9, 10, 11 and 12, the inward folding of the pockets and the increase in cross sectional area is progressively illustrated so that when the cross section 12—12 of Fig. 1 is reached, the cross sectional shape of the conduit will be like what is illustrated in Fig. 12, this figure, however, showing only one-half of the conduit. This inward folding of the marginal portions of the conduit is continued until as the delivery end of the conduit is approached it will appear in cross section substantially as shown in Fig. 13.

Figure 15:
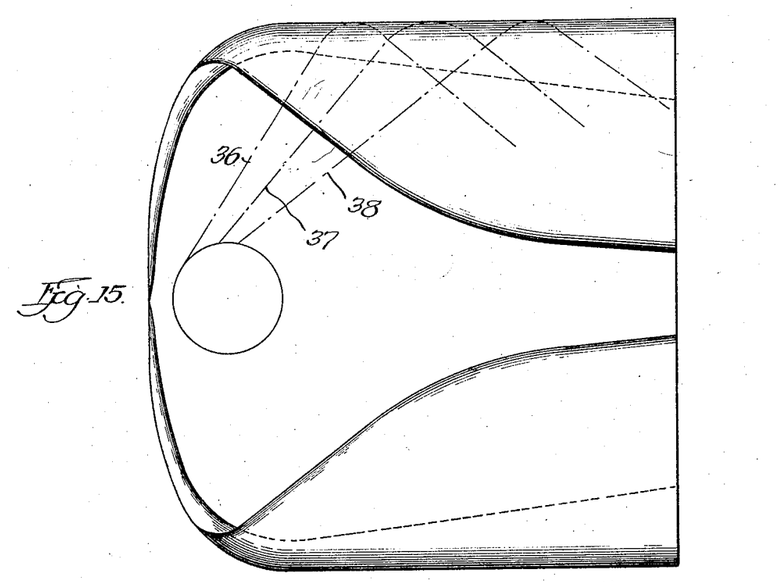
Fig. 15 is a plan view showing the shape of the stream of water as it passes the elbow.

As explained in connection with Figs. 2 and 3, the filaments of water striking the deflecting surface of the elbow tend to diverge laterally to produce a flat, thin fan-like stream. The direction of divergence is indicated by the lines 36, 37 and 38 in Fig. 15, from which it will be observed that the divergent filaments flowing into the lateral pockets of the conduit are deflected or folded over upon themselves so that these filaments travel in a somewhat spiral path, the deflection being accomplished without disturbance of the filaments and without the production of eddies or objectionable cross currents.

Figure 4:
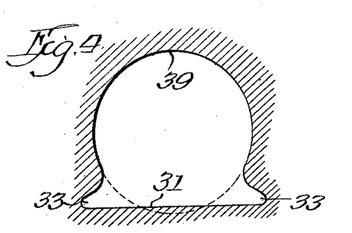
Fig. 4 is a sectional view on the line 4—4 of Fig. 1.
Figure 5:
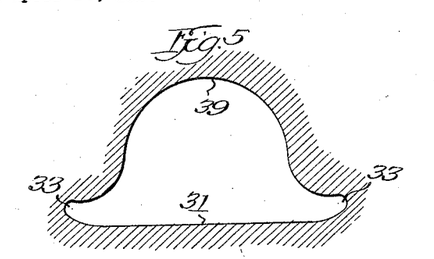
Fig. 5 is a similar view on the line 5—5 of Fig. 1.
Figures 12, 16:
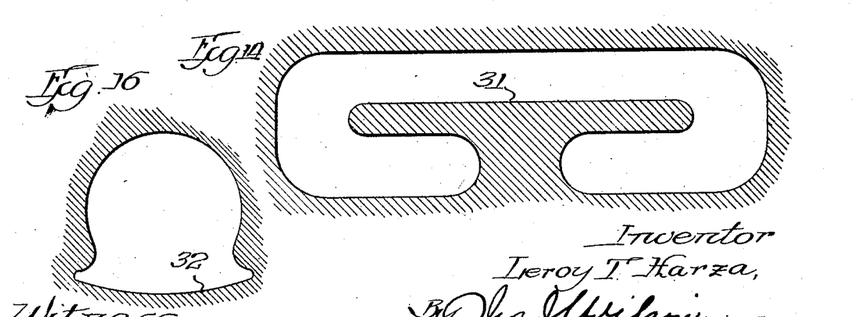
Fig. 16 is a view similar to Fig. 4 showing a conduit having a convex instead of a flat outer deflecting wall.

It will be observed by experiment and as illustrated in Figs. 2 and 3 that the deflected side of the jet will be forced to conform to the concave shape of the deflecting surface, whether this be cylindrical or curved in both directions. The gradual encroachment of the deflecting surface upon the cylindrical continuation of the original section and direction of the jet results in a gradual subtraction from the circular section of the jet on the side of the circle adjacent to the deflecting surface, and the substitution of an essentially equivalent cross section in the form of two fin-like protrusions or thin sheets of water extending outward from the restricted or deflected side of the original cylindrical jet as encroached upon by the deflecting surface. In the meantime the free side of the cylindrical jet, or side opposite the deflecting surface, continues with little change in shape except by subtraction of the segment of increasing altitude and except for a filet of reverse curvature joining it to the spreading sheet. As shown in Figs. 2 and 3, the original cylindrical jet is thus eventually all deflected into a thin sheet of water. Figs. 4 and 16 illustrate the beginning of the deflection, leaving the main cylindrical stream unchanged except by encroachment upon its section and substitution of equivalent area of fan-like or thin sheet of water.

Thus, while the radius of the deflecting surface is subject to the choice of the designer, the profile of the opposite side or inside of the deflected jet is nearly unaffected by the deflecting surface until deflection is complete, except that the sheet is joined to the cylindrical jet by a filet curve of small radius instead of by acute or obtuse angle. This filet curve is usually, if not always, of smaller radius that that of the deflecting surface, unless the latter is very short, which latter is a construction I do not recommend.

The filet curve is shown at 26 in Figs. 2 and 3, corresponding to 41 in Fig. 1. It must be determined experimentally for each radius of deflecting surface and corresponding diameter of jet, but the beginning of this filet curve apparently has no relation to the point of beginning of the deflection of the other side of the jet except that it is subsequent thereto in the case of a relatively large radius of deflection curve as here shown. It will be observed also from Figs. 1 and 4 to 12, inclusive, that the inner wall 39 gradually approaches the outer wall 31 so that the conduit becomes at the point 12—12 of gradually decreasing depth but of increasing width to conform to the natural thin sheet-like shape of the stream flowing therethrough.

Although my invention may be used in any conduit elbow as in a pipe line where change in cross section and velocity are not desired, yet for purposes of hydraulic turbine draft tubes, where this invention will find its chief application, the cross sectional area of the conduit is, however, gradually increased so that the conduit as a whole will serve to convert the velocity head into a pressure head to produce a highly efficient draft tube.

While in the form of the invention thus far illustrated and described the margins of the stream have been folded upwardly and inwardly, it should be manifest that they may equally well be folded downwardly and inwardly, and in Fig. 14 I have illustrated such a construction wherein the lateral pockets or extensions of the conduit instead of being folded upwardly, as shown in Fig. 13, are folded downwardly. The effect upon the flowing stream is substantially the same in either case.

Figure 17:
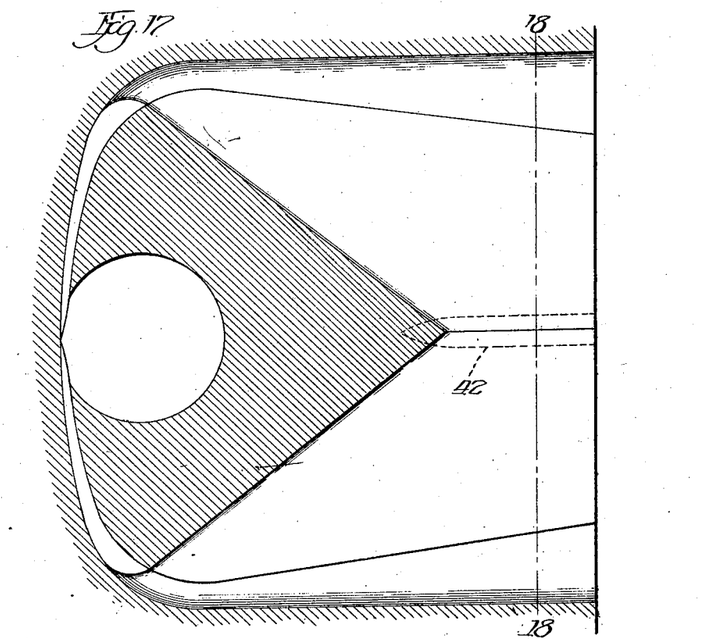
Fig. 17 is a view similar to Fig. 15 illustrating a modified form of conduit.
Figure 18:
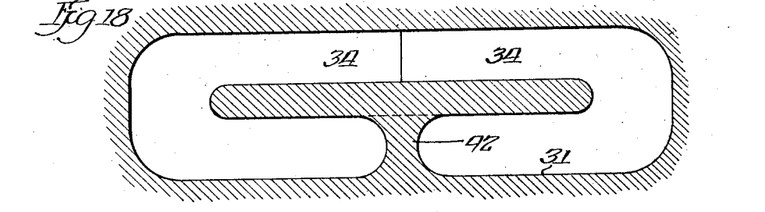
Fig. 18 is a sectional view on the line 18—18 of Fig. 17.

A further modification of the conduit is shown in Figs. 17 and 18 wherein instead of maintaining the ends of the pockets in spaced relation, the conduit is provided with a supporting diaphragm 42 extending longitudinally of the bottom wall 31 and adapted to divide the flowing stream. The margins are gradually folded upwardly and inwardly as previously explained but the inner ends of the pockets 34 are in communication so that the folded margins of the stream may flow together and unite into a continuous substantially cylindrical stream.

Figure 19:
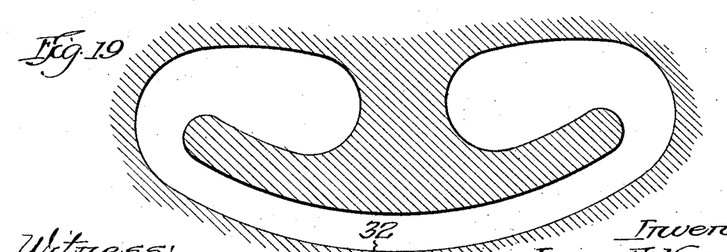
Fig. 19 is a sectional view substantially similar to Fig. 13 of a conduit having a transversely curved instead of a flat bottom wall.
Figure 20:
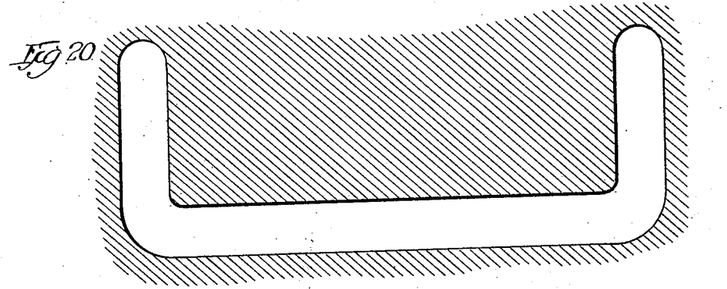
Figs. 20, 21 and 22 are sectional views of modified forms of conduits embodying my invention.
Figure 21:
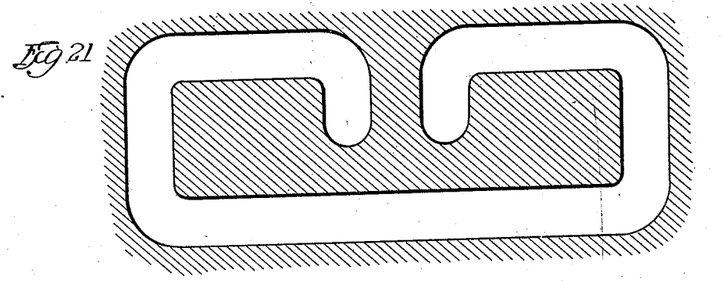
Figure 22:
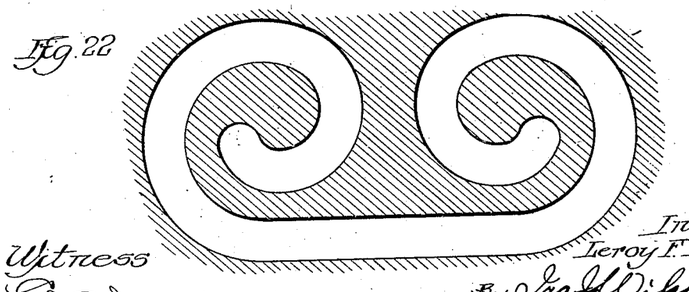

In Fig. 19 a construction similar to that shown in Fig. 13 is illustrated with the exception, however, that the wall 32 is curved in both directions instead of cylindrical as in the case of wall 31, Fig. 19 being a section farther toward the delivery end of a conduit, one section of which is shown in Fig. 16 corresponding to Fig. 4 with the cylindrical deflector. In this construction shown in Fig. 19, the pockets are substantially increased in cross sectional area to accommodate a larger volume of water, which principle can be equally well applied to Figs. 13, 14 and 18 same having no relation to the fact that deflecting wall 32 is curved in both directions.

The experiments upon which the design of my invention are based were performed upon a free jet deflected by a curved surface. For application of my invention to an elbow in a conduit or pipe line, where reduction of velocity is not sought, the experiments and principles are directly applicable. For application to a hydraulic turbine draft tube where reduction in velocity is the prime purpose, the experimentally determined diameter of free jet and thickness of deflected sheet must be gradually increased from turbine to point of discharge. These increases can be made at a uniform rate or at an increasingly or decreasingly rapid rate as judgment and experiments may hereafter dictate, as the novelty of my invention is not dependent upon choice of this law of increase. Likewise, the fundamental principle of my invention requires that the discharging water be spread out in a thin sheet as in Figs. 2 and 3 by gradual subtraction of section from the deflected side of the jet to form the sheet. Such a sheet of water is not fundamentally altered by the fact of being lapped over to confine it to narrower width, for the reason that a free jet impinging tangentially against a surface that is thus folded over would be compelled to lap over in this same way and would do so without loss of velocity or energy if hydraulic friction on the guiding surface be ignored.

I have illustrated and described various modifications of my invention but many other forms are comprehended within the scope of the invention, and it should be obvious that the conduit may be constructed to fold the margins of the flowing stream in any desired relation as, for instance, the margins of the stream may be simply extended upwardly producing a stream of U shape in cross section, or they may be rolled into scroll or spiral form, the particular shape being immaterial so long as the stream is caused to flow without undue resistance or the production of undesirable eddies and cross currents, and the overall dimensions of the conduit are kept within practical limitation.

It is believed that the construction, operation and many of the advantages of my invention should be apparent from the foregoing without further description and that the invention is capable of wide modification and variation without departing from the scope of the invention as defined in the following claims.

I claim:

1. In a fluid conveying conduit, a bend or elbow comprising a guiding surface substantially flat in cross section to deflect the fluid stream and an opposed surface to complete the enclosure of the fluid stream, said opposed surface being constructed to conform substantially to the natural free surface assumed by said fluid stream when deflected by said guiding surface in the absence of the opposed surface but otherwise flowing unconfined without other influence than initial velocity, said conduit being so constructed that its bore changes progressively from circular section into a wide, thin, divergent channel, said transition taking place by progressive encroachment of the deflecting surface upon the imaginary cylindrical continuation of the initial form and direction of the fluid stream, each increment of encroachment being compensated by substantially equal increments of sectional area of protruding divergent channel, the portion of said initial cylinder not encroached upon at any intermediate point of fluid flow remaining substantially of original section until the entire stream has been converted into a thin fan-like film, and guide passages for reconsolidating said thin, fan-like film into any required limitations of occupied width by folding the geometrical figure of said film over upon itself.

2. A hydraulic turbine draft tube of elbow form comprising a guiding surface to deflect the stream and an opposed surface to complete the enclosure of the stream, said opposed surface being shaped and disposed relatively to said guiding surface to depart progressively, by increasing dimensions and resulting cross sections but substantially similar geometrical form in cross section, from the natural free surface which would be assumed by the original fluid stream if deflected by said guiding surface in the absence of the opposed surface but otherwise flowing unconfined without other influence than initial velocity, said draft tube being shaped to transform the fluid stream progressively as deflected from original section into a thin fan-like divergent sheet, and progressively to increase said divergent sheet in thickness in excess of natural thickness to retard its velocity as required by the purpose of a draft tube.

3. An elbow conduit, the cross sectional shape of which merges from a circular form forwardly of the curved portion into a wide shallow portion beyond the curved portion, the margins of said shallow portion being gradually rolled toward the central plane of said shallow portion to reduce the overall width of said flattened portion of the conduit without diminishing the cross sectional area of said conduit.

4. An elbow conduit for changing the direction of flow of a liquid and recovering the energy therein, having a gradually curved deflecting outer wall, an inner wall shaped to conform substantially to the contour of a free jet impinging tangentially against said outer wall, and side walls diverging from the area of initial deflection, the cross section of the conduit merging from a circle forwardly of the deflecting wall into a shallow widened form beyond said deflecting wall, the margins of said widened portion being gradually folded back to decrease the overall width of the conduit.

5. A longitudinally curved elbow conduit, substantially circular at its intake end, merging from the initial point of longitudinal curvature into a ribbon-like cross sectional shape, the margins of the conduit being gradually folded inwardly from the point of initial curvature to reduce the overall width of the conduit.

6. A longitudinally curved deflecting conduit of elbow shape merging from a circle into a flat cross sectional shape, and having the margins thereof gradually folded inwardly from the point of initial longitudinal curvature to thereby minimize the overall width of the conduit without obstructing the unrestricted flow of liquid therethrough.

7. A draft tube formed to provide an elbow, the shorter radius of which is shaped to conform substantially to the inner contour of a free jet of liquid impinging tangentially against the outer radius of the elbow, said conduit being flattened beyond the elbow and the margins thereof being gradually folded inwardly from the point of initial longitudinal curvature of the conduit, said folded margins being larger in vertical dimensions than the unfolded central portion of the conduit.

8. In a fluid conveying conduit, a portion of substantially circular cross section and a communicating bend or elbow comprising a curved outer wall having a selected radius of curvature upon which a fluid stream is adapted to impinge and by which the stream is deflected from its original direction and circular cross section form into a thin divergent fan-like film of fluid, and an opposed confining wall which for the intake area of the elbow is of diminishing particircular cross sectional form whereby the original circular cross sectional form of the fluid stream is in part maintained until substantially the entire cross section of said stream has merged into the said film of fluid and an inner curved wall designed to conform substantially to the surface contour of the fluid at the merging of the said stream into said film of fluid, said inner wall being connected with the aforesaid confining wall to form a closed duct and forming therewith a confining surface which substantially conforms to the natural stream of fluid when impinged upon the outer curved deflecting wall of the selected curvature.

9. In a fluid conveying conduit, an elbow comprising an outer curved wall of selected curvature and which is substantially flat in cross section, joined by a confining wall which is initially substantially circular in cross section and which changes into circular segmental form of progressively decreasing altitude, whereby the fluid stream of initially circular form in cross section when impinged upon said outer wall is progressively changed into a thin fan-like film of fluid by and upon said wall until substantially the entire cross sectional area of said stream has merged into the said film, the merger effecting the introduction of fillet curves of transition from the final or residual circular segment of the stream into the film and the confining wall being formed at the area of merger to conform substantially to these fillet curves, whereby the confining wall as a whole substantially conforms to the natural contour of a free stream of fluid when impinged upon the outer wall of the selected curvature.

10. A conduit constructed substantially in accordance with claim 9 and wherein the outer curved wall progressively increases in width from the inlet toward the discharge ends of the conduit.

11. A conduit constructed substantially in accordance with claim 9 and wherein the outer curved wall progressively increases in width from inlet toward discharge ends of the conduit in proportion to the diminution of altitude of the cross sectional segmental confining wall and wherein the lateral portions of said confining wall are turned outwardly into parallel spaced relation to the said outer wall and are jointed thereto to form an enclosure of progressively increasing width to accommodate the said film of fluid.

12. In a fluid conveying conduit, a bend or elbow comprising a guiding surface of selected curvature to deflect the fluid stream from its original course and an opposed confining surface laterally joining said guiding surface to complete the enclosure of the fluid stream and form an enclosed conduit, said opposing surface being shaped and disposed relatively to said guiding surface to conform substantially to the natural free surface assumed by the main body of said fluid stream when deflected by said guiding surface in the absence of the opposing surface but otherwise flowing unconfined without other influence than initial velocity and to confine the fluid stream to its natural free path, said conduit being so constructed that its bore changes progressively from original section into a wide, thin divergent fan-like channel.

13. A hydraulic turbine draft tube of elbow form comprising a guiding surface to deflect the stream from its original course and an opposed confining surface to complete the enclosure of the stream and form a closed duct therefor, said opposed surface being shaped and disposed relatively to said guiding surface to depart progressively by increasing dimensions and resulting cross sections but substantially similar geometrical section formed from the naturally free surface which would be assumed by the original fluid stream if deflected by said guiding surface in the absence of the opposed surface but otherwise flowing unconfined without other influence than initial velocity, said confining draft tube transforming the fluid stream progressively as deflected from original section into a thin fan-like divergent sheet of progressively increasing thickness in excess of natural thickness to retard velocity, said tube terminating in a portion shaped and having side passages therethrough to reconsolidate said broad film into a stream of relatively narrower width.

LEROY F. HARZA.